(12) United States Patent
Liffring et al.

(10) Patent No.: US 9,809,321 B2
(45) Date of Patent: Nov. 7, 2017

(54) ELECTRICAL POWER DISTRIBUTION SYSTEM WITH LOCALIZED DISTRIBUTION CONVERSION UNITS

(71) Applicant: The Boeing Company, Chicago, IL (US)

(72) Inventors: Mark Eugene Liffring, Seattle, WA (US); Kamiar J. Karimi, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 437 days.

(21) Appl. No.: 14/528,698

(22) Filed: Oct. 30, 2014

(65) Prior Publication Data

US 2016/0122033 A1    May 5, 2016

(51) Int. Cl.
*H02J 3/00*        (2006.01)
*B64D 41/00*      (2006.01)

(52) U.S. Cl.
CPC .............. *B64D 41/00* (2013.01); *H02J 3/00* (2013.01); *B64D 2221/00* (2013.01)

(58) Field of Classification Search
CPC ....... B64D 2221/00; B64D 41/00; H02J 3/00; H02J 4/00
See application file for complete search history.

(56) References Cited

U.S. PATENT DOCUMENTS

| 6,664,656 | B2 | 12/2003 | Bernier |
| 7,612,514 | B2 | 11/2009 | Anghel et al. |
| 7,615,892 | B2 | 11/2009 | Anghel et al. |
| 7,800,245 | B2 * | 9/2010 | Michalko ............... H02J 5/00 307/19 |
| 7,922,117 | B2 | 4/2011 | Wavering et al. |
| 2012/0086266 | A1 * | 4/2012 | Shipley ................. H02J 4/00 307/9.1 |
| 2013/0076120 | A1 * | 3/2013 | Wagner ............... B64D 33/00 307/9.1 |
| 2013/0214597 | A1 | 8/2013 | Malo |

\* cited by examiner

*Primary Examiner* — Ryan Johnson
(74) *Attorney, Agent, or Firm* — Thompson Hine LLP

(57) ABSTRACT

An electrical power distribution system for converting and distributing electrical power to local loads within a vehicle is disclosed. The electrical power distribution system includes at least one generator providing high voltage AC (HVAC) power, a primary power panel for receiving the HVAC power from the generator, and a plurality of distribution conversion units located throughout the vehicle. The plurality of distribution conversion units convert the HVAC power from the primary power panel into medium voltage AC (MVAC) power and low voltage DC (LVDC) power for consumption by the local loads within the vehicle. The electrical power distribution system also includes a plurality of HVAC distribution feeder lines. Each HVAC distribution feeder line connects the primary power panel to one of the plurality of distribution conversion units.

20 Claims, 2 Drawing Sheets

ELECTRICAL POWER DISTRIBUTION SYSTEM WITH LOCALIZED DISTRIBUTION CONVERSION UNITS

FIELD

The disclosed system relates to an electrical power distribution system and, more particularly, to an electrical power distribution system including a plurality of high voltage AC (HVAC) distribution feeder lines for providing HVAC power throughout a vehicle to localized distribution conversion units.

BACKGROUND

An aircraft may include an electrical power distribution system for distributing power to various electrical subsystems at different voltage levels. For example, electrically-powered mechanical systems within the aircraft may use alternating current (AC) at relatively high voltage. In contrast, avionics systems typically operate using direct current (DC) at relatively low voltage. Electrical power may be created by generators that are driven by main engines of the aircraft. The electrical power created by the generators may be converted using equipment such as transformers, power electronics converters, or a combination of both, and is sent to various subsystems within the aircraft. The electrical power distribution system also includes a back-up power source, such as a battery, that is independent of the aircraft's main engine.

The conversion equipment may be located within a single, centralized location within the aircraft. In particular, the conversion equipment is typically located within the electronics equipment (EE) bay of the aircraft. The electrical power distribution system may transmit appropriate voltages from the conversion equipment located within the EE bay to various loads throughout the aircraft using multiple feeders. Specifically, the electrical power system may either have each load receive an individual feeder from the EE bay, or multiple loads may be ganged nearby the load and power is provided by a single large feeder. Each feeder requires wire protection. Wire protection may be accomplished using a circuit breaker, a solid-state power controller (SSPC), or a combined electronic control circuit and contactor sometimes referred to as an electrical load control unit (ELCU). Larger feeders may require larger protection devices, since higher fault currents are produced. However, this results in significant weight that is added to the aircraft.

Relatively thick wiring is typically used for the feeders between the conversion equipment in the EE bay and the loads. However, thicker feeder wires require a greater amount of insulation, which also adds weight to the aircraft. Moreover, lightning threats to the aircraft may increase as well due to the lower impedance that is created with thicker feeder wires. These lightning threats may become especially problematic for a composite based aircraft. This is because composite based aircraft are constructed of carbon fiber reinforced plastic (CFRP) that has limited shielding and current return capacity. Additionally, wire protection requirements will also increase due to the higher fault currents. Finally, routing multiple feeder wires from the EE bay, which is typically located at the front of the aircraft, throughout the entire length of the aircraft may result in a significant amount of wire being used. Longer feeder wires also add significant weight to the aircraft as well. Thus, there exists a continuing need for an improved, lighter electrical power distribution system in an aircraft.

SUMMARY

In one aspect, an electrical power distribution system for converting and distributing electrical power to local loads within a vehicle is disclosed. The electrical power distribution system includes at least one generator providing high voltage AC (HVAC) power, a primary power panel for receiving the HVAC power from the generator, and a plurality of distribution conversion units located throughout the vehicle. The plurality of distribution conversion units convert the HVAC power from the primary power panel into medium voltage AC (MVAC) power and low voltage DC (LVDC) power for consumption by the local loads within the vehicle. The electrical power distribution system also includes a plurality of HVAC distribution feeder lines. Each HVAC distribution feeder line connects the primary power panel to one of the plurality of distribution conversion units.

In another aspect, an electrical power distribution system for converting and distributing electrical power to local loads within an aircraft is disclosed. The electrical power distribution system includes a plurality of main engines, a plurality of generators providing HVAC power, a plurality of primary power panels, a plurality of distribution conversion units located throughout the aircraft, and a plurality of HVAC distribution feeder lines. Each of the plurality of generators is driven by one of the plurality of main engines. Each primary power panel receives the HVAC power from a respective one of the plurality of generators. The plurality of distribution conversion units convert the HVAC power received from one of the plurality of primary power panels into MVAC power and LVDC power for consumption by local loads within the aircraft. Each HVAC distribution feeder line connects the one of the primary power panels to one of the plurality of distribution conversion units.

In another aspect, a method of converting and distributing electrical power to local loads within an aircraft is disclosed. The method includes creating high voltage AC (HVAC) power by a plurality of generators, where each of the plurality of generators is driven by one of the plurality of main engines. The method also includes sending the HVAC power from the plurality of generators to respective primary power panels. The method also includes sending the HVAC power from the respective primary power panels to a plurality of distribution conversion units located throughout the aircraft. Finally, the method includes converting the HVAC power from the primary power panel into MVAC power and LVDC power for consumption by local loads within the aircraft by the plurality of distribution conversion units.

Other objects and advantages of the disclosed method and system will be apparent from the following description, the accompanying drawings and the appended claims.

DETAILED DESCRIPTION

Figure 1:
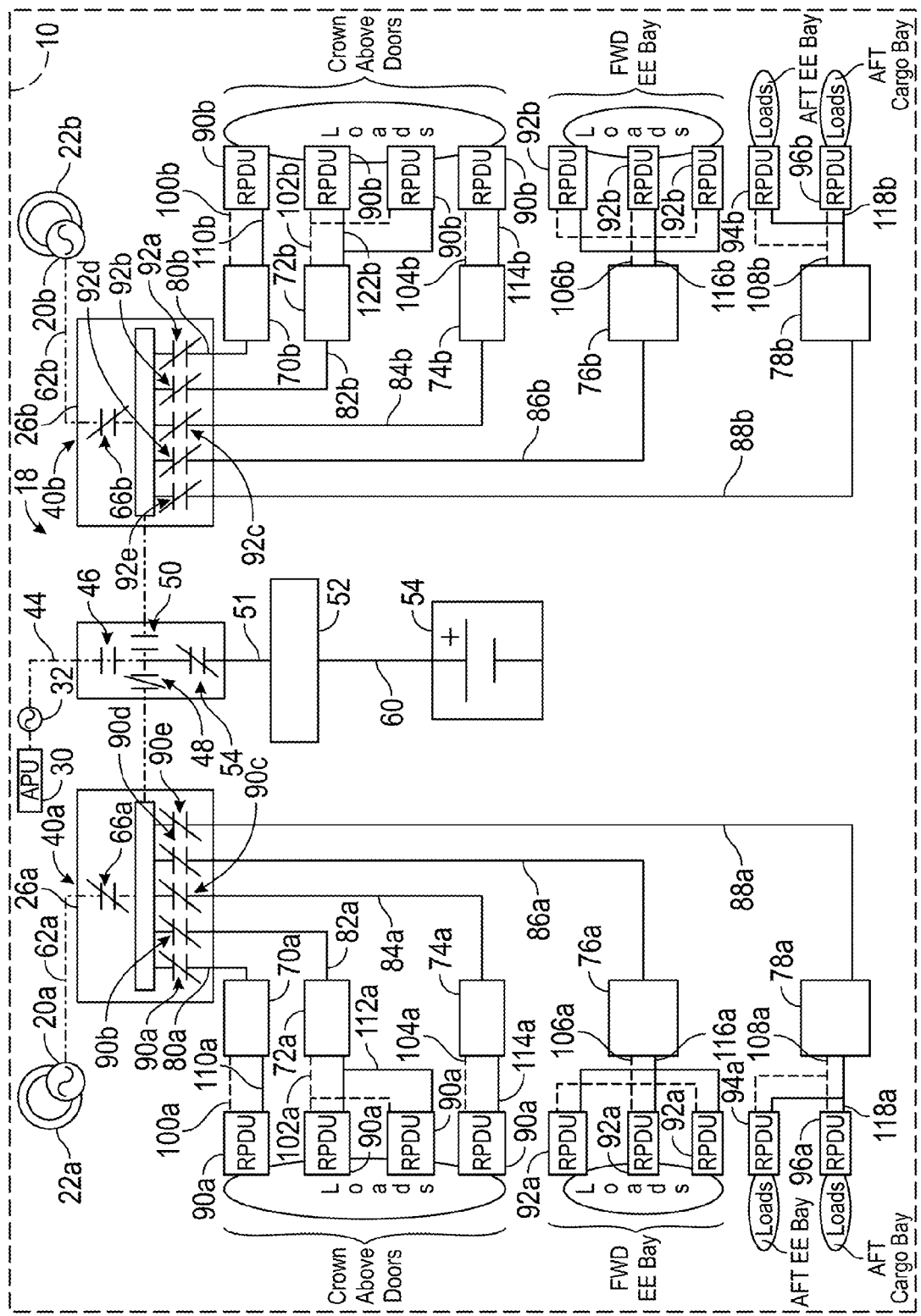
FIG. 1 is a schematic diagram of the disclosed electrical power distribution system including a plurality of high voltage AC (HVAC) distribution feeder lines for providing HVAC power throughout an aircraft.
Figure 2:
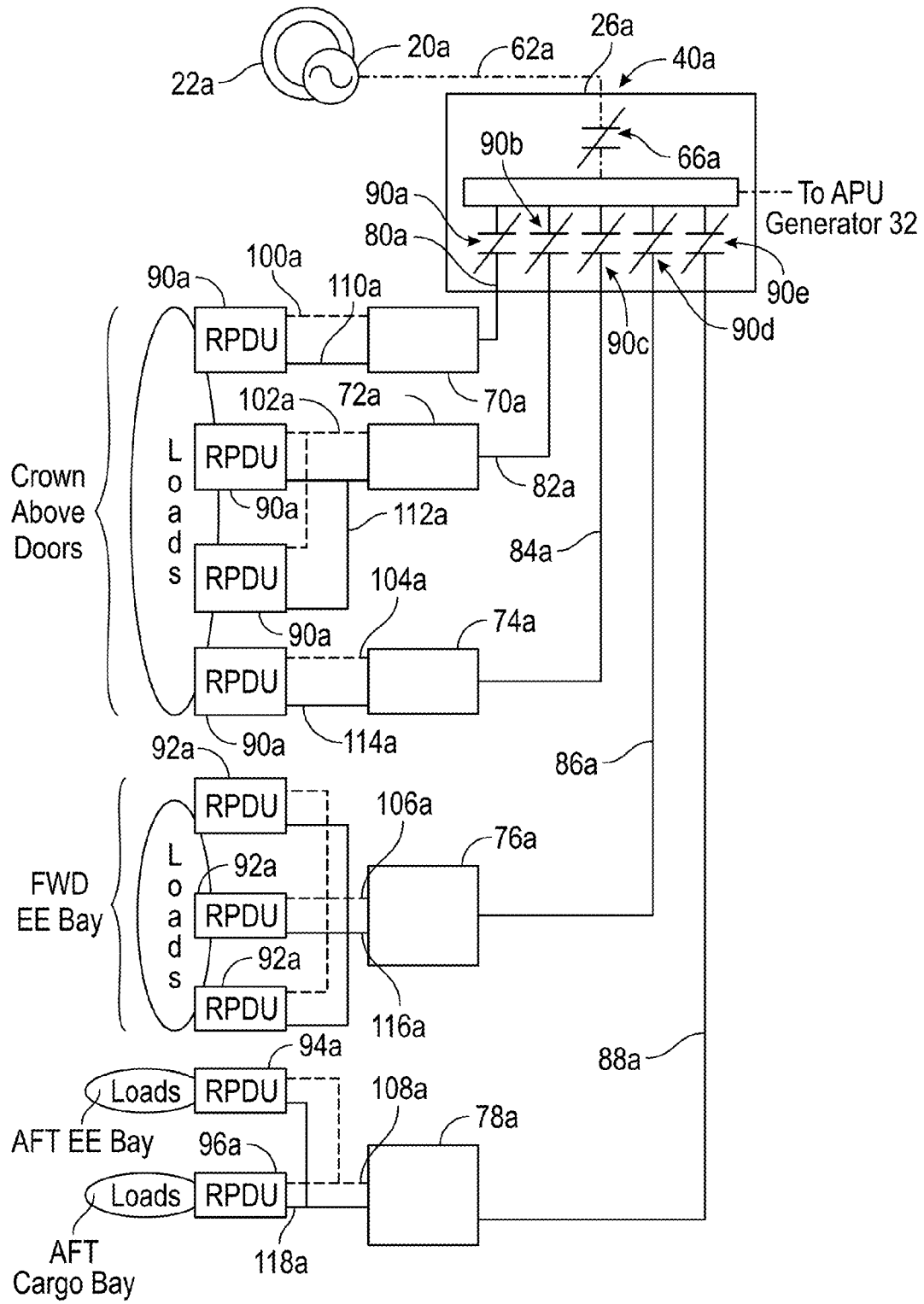
FIG. 2 is an enlarged view of a left side of the disclosed electrical power distribution system.

As shown in FIGS. 1 and 2, the disclosed electrical power distribution system 18 of an aircraft 10 according to an aspect of the disclosure may include a left generator 20a and a right generator 20b (only the left generator 20a is illustrated in FIG. 2). In one embodiment, the generators 20a, 20b may be driven by respective left and right main engines 22a, 22b of the aircraft 10, where the left main engine generator 20a may be mechanically coupled to the left main engine 22a, and the right generator 20b may be mechanically coupled to the right main engine 22b by a gearbox (not shown). Alternatively, in another embodiment, the generators 20a, 20b may be integrated with one of the main engines 22a, 22b. Those skilled in the art will readily appreciate that in an alternative embodiment the aircraft 10 may include more than two main engines that each drive a respective generator as well.

The generators 20a, 20b provide high voltage AC (HVAC) power to respective left and right primary power panels 26a, 26b. For example, in one embodiment, the generators 20a, 20b provide nominal 230 VAC power to the left and right primary power panels 26a, 26b. However, it is to be understood that other HVAC values may be used as well. For purposes of discussion, HVAC power is generally any voltage value above about 150 VAC. It is to be understood that nominal 230 VAC is generally accepted as a standard value that includes an acceptable range of +/−10 V.

Although an aircraft 10 is illustrated in FIG. 1 and is described in the embodiments below, those skilled in the art will readily appreciate that the disclosed electrical power distribution system 18 may be used in a variety of vehicles. For example, the electrical power distribution system 18 may be employed within any type of maritime vessel. However, it is to be understood that the generators may be located in a distributed fashion within larger maritime vessels such as navy or cruise ships.

The electrical power distribution system 18 may also include one or more auxiliary power units (APUs) 30. Some examples of the APU 30 include, but are not limited to, a gas turbine engine, an internal combustion engine, or a fuel cell. An APU generator 32 may be driven by the APU 30. Specifically, the APU generator 32 may be integral or coupled to the APU 30. The APU generator 32 provides electrical power to the aircraft 10 in lieu of the power provided by the main engines 20a, 20b. Specifically, the APU generator 32 may be used to provide electrical power to various systems of the aircraft 10 during static ground operations at an airline gate, as well as during power-up and/or power-down conditions.

In an embodiment, the APU generator 32 provides HVAC power. For example, in one embodiment the APU generator 32 provides nominal 230 VAC power, however it is to be understood that the APU generator 32 may produce other HVAC voltage values as well. A HVAC main feed line 44 may be used to selectively connect the APU generator 32 to either the left and right power busses 40a, 40b of the aircraft 10. The HVAC main feed line 44 includes a contactor 46 that is normally open. Specifically, it is understood that only one generator may be connected to the power busses 40a, 40b at a time. Thus, during normal operation where both generators 20a, 20b are operational, the contactor 46 is open. A contactor 48 may be located between the APU generator 32 and the left power bus 40a, and a contactor 50 may be located between the APU generator 32 and the right power bus 40b. The contactors 48, 50 are explained in greater detail below.

The electrical power distribution system 18 also includes a HVAC distribution feeder 51, which is also configured to transmit HVAC power, such as nominal 230 VAC power, to a bi-directional power converter 52. A contactor 54 may be located in the HVAC distribution feeder 51 to connect either the left or the right power bus 40a, 40b with the bi-directional power converter 52. The bi-directional power converter 52 converts the HVAC power (e.g., 230 VAC power) into low voltage DC (LVDC) power, and also converts LVDC power into HVAC power. For example, in one embodiment, the LVDC power is nominal 28 VDC power, which includes a range of about 18 to about 34 VDC during normal operation. However, it is to be understood that other low voltage DC values under about 70 VDC may be used as well.

A LVDC load feeder 60 may be used to connect the bi-directional power converter 52 with an energy storage device 54. The energy storage device 54 may be any type of storage device for storing DC power such as, for example, a battery. The energy storage device 54 may be used as emergency power. The energy storage device 54 may be used to provide power to critical DC loads in the event there is a total loss of generator power within the aircraft 10 (i.e., the generators 20a, 20b and APU generator 32) for a minimum specified period of time. Specifically, in the event there is a total loss of generator power load shed logic turns off all AC loads and non-critical DC loads within the electrical distribution system 10, and the energy storage device 54 may discharge through the bi-directional power converter 52 in order to provide AC power to both the left and right power busses 40a, 40b. In the embodiment as illustrated, in a default state the contactor 48 is normally open, the contactor 50 is normally closed, and the contactor 54 is normally closed. Thus, in the default state the energy storage device 54 is being charged, or is maintained at full charge level through the left bus 40a.

The bi-directional power converter 52 may be located proximate to the energy storage device 54 such that the length of the LVDC load feeder 60 is relatively short. For example, in one embodiment, the length of the LVDC load feeder 60 may range from about one meter to about four meters.

Both the left and right generators 20a, 20b may be connected to the respective primary power panels 26a, 26b by respective HVAC main feed lines 62a, 62b. Specifically, the left generator 20a may be connected to the left primary power panel 26a through a contactor 66a located within the HVAC main feed line 62a. Likewise, the right generator 20b may be connected to the right primary power panel 26b through a contactor 66b located within the HVAC main feed line 62b. The contactor 66a is closed when the left generator 20a is operating, and the contactor 66b is closed when the right generator 20b is operating.

Both the primary power panels 26a, 26b may be used to send HVAC power to respective distribution conversion units 70a, 70b, 72a, 72b, 74a, 74b, 76a, 76b, 78a and 78b located throughout the aircraft 10. A plurality of HVAC distribution feeder lines 80a, 80b, 82a, 82b, 84a, 84b, 86a, 86b, 88a, and 88b connect the primary power panels 26a, 26b to a respective one of the distribution conversion units 70a, 70b, 72a, 72b, 74a, 74b, 76a, 76b, 78a, and 78b. Specifically, the HVAC distribution feeder lines 80a, 82a, 84a, 86a, and 88a connect the left primary power panel 26a to respective distribution conversion units 70a, 72a, 74a, 76a, and 78a. A series of normally closed contactors 90a, 90b, 90c, 90d, and 90e may be located within respective HVAC distribution feeder lines 80a, 82a, 84a, 86a, and 88a. Likewise, the HVAC distribution feeder lines 80b, 82b, 84b, 86b, and 88b connect the left primary power panel 26b to respective distribution conversion units 70b, 72b, 74b, 76b, and 78b. A series of normally closed contactors 92a, 92b, 92c, 92d, and 92e may be located within respective HVAC distribution feeder lines 80b, 82b, 84b, 86b, and 88b.

The distribution conversion units 70a, 70b, 72a, 72b, 74a, 74b, 76a, 76b, 78a, and 78b may convert HVAC power from the primary power panels 26a, 26b into medium voltage AC (MVAC) power and LVDC power for consumption by local loads within the aircraft 10. In one exemplary embodiment, the MVAC power may be nominal 115 VAC power. However it is to be understood that other MVAC voltage values ranging from under about 150 VAC to over about 80 VAC may be produced as well. It is also to be understood that nominal 120 VAC is standard MVAC power, and generally ranges from about 110 VAC to about 130 VAC during operation.

In one embodiment, distribution conversion units 70a, 70b, 72a, 72b, 74a, 74b, 76a, 76b, 78a and 78b each include an autotransformer to convert the HVAC power into MVAC power. The distribution conversion units 70a, 70b, 72a, 72b, 74a, 74b, 76a, 76b, 78a, and 78b may also include an autotransformer rectifier unit (ATRU) to convert the HVAC power into LVDC power.

The distribution conversion units 70a, 70b, 72a, 72b, 74a, 74b, 76a, 76b, 78a and 78b may send both MVAC power and LVDC power to respective remote power distribution units (RPDUs) 90a, 90b, 92a, 92b, 94b, 96a, and 96b located throughout the aircraft 10. As explained in greater detail below, the RPDUs 90a, 90b, 92a, 92b, 94b, 96a, and 96b may distribute both MVAC power and LVDC power to various localized loads within the aircraft 10. In one embodiment, the RPDUs are based on solid state power controllers (SSPCs) instead of traditional thermal circuit-breakers and relays. The RPDUs 90a, 90b, 92a, 92b, 94b, 96a, and 96b distribute power to various local loads within the aircraft 10. Some examples of the localized loads include, for example, galleys, in-flight entertainment systems, interior lighting, lavatory fans, and door heaters.

In the embodiment as illustrated, the aircraft 10 may include a plurality of RPDUs 90a, 90b that are located within a crown area (i.e., the area between a passenger cabin and an upper external fuselage) of the aircraft 10, above the exit doors (not illustrated). In particular, eight RPDUs 90a, 90b are illustrated, where four RPDUs 90a are connected to the right bus 40a and four RPDUs 90b are connected to the left bus 40b. The aircraft 10 may also include a plurality of RPDUs 92a, 92b located within a forward electronics equipment (EE) bay of the aircraft 10. In particular, six RPDUs 92a, 92b are illustrated, above the exit doors (not illustrated). In particular, eight RPDUs 90a, 90b are illustrated, where three RPDUs 92a are connected to the right bus 40a and three RPDUs 92b are connected to the left bus 40b. The aircraft 10 may also include a plurality of RPDUs 94a, 94b located within the aft EE bay of the aircraft 10. In particular, two RPDUs 94a, 94b are illustrated. Finally, the aircraft 10 may also include a plurality of RPDUs 96a, 96b located within the aft cargo bay of the aircraft 10. In particular, two RPDUs 96a, 96b are illustrated. It is to be understood that FIG. 1 is merely exemplary in nature and that any number of RPDUs located in any number of locations throughout the aircraft 10 may be used as well.

As seen in the figures, the distribution conversion units 70a, 70b, 72a, 72b, 74a, and 74b are each connected to one or more of the RPDUs 90a, 90b. The distribution conversion units 76a, 76b are each connected to three respective RPDUs 92a, 92b. The distribution conversion units 78a, 78b are each connected to a respective RPDU 94a, 94b, 96a, and 96b. In particular, a plurality of MVAC load feeders 100a, 100b, 102a, 102b, 104a, 104b, 106a, 106b, 108a and 108a connect a respective one of the distribution conversion units 70a, 70b, 72a, 72b, 74a, 74b, 76a, 76b, 78a and 78b with one or more of the RPDUs 90a, 90b, 92a, 92b, 94a, 94b, 96a and 96b. Likewise, a series of LVDC load feeders 110a, 110b, 112a, 112b, 114a, 114b, 116a, 116b, 118a, and 118b connect a respective one of the distribution conversion units 70b, 72b, 74b, 76b, 78a, and 78b with a respective one or more of the RPDUs 90b, 92b, 96b, and 96b. The LVDC load feeders 110a, 110b, 112a, 112b, 114a, 114b, 116a, and 116b transmit LVDC power.

The distribution conversion units 70a, 70b, 72a, 72b, 74a, 74b, 76a, 76b, 78a, and 78b may be localized within the aircraft 10, and are located proximate or geographically close to the respective RPDUs 90a, 90b, 92a, 92b, 94b, 96a, and 96b. This is because the MVAC load feeders 100a, 100b, 102a, 102b, 104a, 104b, 106a, and 106b as well as the LVDC load feeders 110a, 110b, 112a, 112b, 114a, 114b, 116a, and 116b typically comprise of thicker wires that are relatively heavy, thereby adding substantial weight to the aircraft 10. For example, in one embodiment, the distribution conversion units 70a, 70b, 72a, 72b, 74a, 74b, 76a, 76b, 78a, and 78b may be located at a distance of about three meters from the respective RPDU 90a, 90b, 92a, 92b, 94b, 96a, and 96b. Those skilled in the art will readily appreciate that the length of the MVAC load feeders as well as the LVDC should be made as short as possible in order to minimize the weight added to the aircraft 10.

The HVAC distribution feeder lines 80a, 80b, 82a, 82b, 84a, 84b, 86a 86b, 88a, and 88b are thinner, smaller diameter wires when compared to the MVAC load feeders 100a, 100b, 102a, 102b, 104a, 104b, 106a, 106b, 108a, and 108b as well as the LVDC load feeders 110a, 110b, 112a, 112b, 114a, 114b, 116a, 116b, 118a, and 118b. The thinner HVAC wires result in significant weight and volume reduction when compared to some types of electrical power distribution systems currently available that convert HVAC power at a centralized location and send MVAC and LVDC power throughout the aircraft using heavier wire. This is because distributed HVAC power allows for much lower current through feeder wires. Those skilled in the art will readily appreciate that lower current results in a smaller wire diameter, which in turn results in less weight added to the aircraft 10.

In one illustrative embodiment, the HVAC distribution feeder lines 80a, 80b, 82a, 82b, 84a, 84b, 86a 86b, 88a, and 88b may be a single set of 3 phase wires (230 VAC at 28A/phase). The disclosed HVAC distribution feeder lines 80a, 80b, 82a, 82b, 84a, 84b, 86a 86b, 88a, and 88b may replace MVAC and LVDC feeder connections that are currently used on some types of aircraft today, which convert HVAC power into MVAC and LVDC power at a centralized location (i.e., the EE bay). In particular, the current MVAC feeders may include 3 wires (115 VAC at 15 A/phase), and the LVDC feeder connections may include a set of two wires (28 VDC at 50A/feeder). Those skilled in the art will readily appreciate that the disclosed HVAC distribution feeders not only result in fewer, smaller diameter wires distributed throughout the aircraft 10, but also result in an overall weight saving due to a reduced amount of support brackets and hardware required for mounting and routing throughout the aircraft 10. Moreover, no shields may be needed for the disclosed HVAC distribution feeders.

The disclosed electrical power distribution system 18 may provide a more compact, lighter approach for converting and distributing electrical power throughout an aircraft. In particular, the disclosed electrical power distribution system 18 allows for decentralization conversion of HVAC power into both MVAC and LVDC power, and also utilizes a reduced number of power feeders throughout the aircraft 10. Moreover, the electrical power distribution system 18 also results in reduced lightning threats to the aircraft 10, which may be especially beneficial if the aircraft 10 is a composite based aircraft constructed of carbon fiber reinforced plastic (CFRP). The reduced lightning threats may be attributed to two factors. First, electrical isolation may be provided by the localized distribution conversion units located throughout the aircraft 10. Second, there are no large loops for magnetic field coupling or common (shared) conducted currents during a lightning event.

It is also to be understood that the disclosed electrical distribution system 18 may also result in improved MVAC and LVDC power quality as well. This is because of the regulation provided by active feedback and control for local outputs, reduced voltage drops due to shorter lengths of wiring, and less impact due to load changes such as DC offset or AC ripple changes. Those skilled in the art will also appreciate that the disclosed electrical power distribution system 18 may also result in a significant reduction of labor due to design (i.e., non-recurring engineering) as well as installation and inspection of the HVAC distribution feeders. The disclosed electrical distribution system 18 may also result in simplified section-level power-up testing using a single power feed and test control.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. An electrical power distribution system for converting and distributing electrical power to local loads within a vehicle, comprising:
    at least one generator providing high voltage AC (HVAC) power;
    a primary power panel for receiving the HVAC power from the generator;
    a plurality of distribution conversion units located throughout the vehicle, wherein the plurality of distribution conversion units convert the HVAC power from the primary power panel into medium voltage AC (MVAC) power and low voltage DC (LVDC) power for consumption by the local loads within the vehicle;
    a plurality of HVAC distribution feeder lines, wherein each HVAC distribution feeder line connects the primary power panel to one of the plurality of distribution conversion units;
    a bi-directional power converter for converting the HVAC power into LVDC power and also converting LVDC power into HVAC power; and
    an energy storage device in communication with the bi-directional power converter, wherein the energy storage device provides HVAC power and MVAC power in response to a loss of generator power.

2. The electrical power distribution system of claim 1, comprising a plurality of remote power distribution units (RPDUs) located throughout the vehicle to distribute both the MVAC power and the LVDC power to the local loads.

3. The electrical power distribution system of claim 2, comprising a plurality of MVAC load feeders connecting a respective one of the plurality of distribution conversion units with a respective one of the plurality of RPDUs.

4. The electrical power distribution system of claim 2, comprising a plurality of LVDC load feeders connecting a respective one of the plurality of distribution conversion units with a respective one of the plurality of RPDUs.

5. The electrical power distribution system of claim 1, wherein the HVAC power is a voltage value above about 150 VAC.

6. The electrical power distribution system of claim 1, wherein the MVAC power ranges from over about 80 VAC to under about 150 VAC.

7. The electrical power distribution system of claim 1, wherein the LVDC power is under about 70 VDC.

8. The electrical power distribution system of claim 1, comprising at least one auxiliary power unit (APU) and an APU generator driven by the APU.

9. The electrical power distribution system of claim 1, wherein the energy storage device provides power to critical DC loads within the vehicle if there is a total loss of generator power.

10. An electrical power distribution system for converting and distributing electrical power to localized loads within an aircraft, comprising:
    a plurality of main engines;
    a plurality of generators providing high voltage AC (HVAC) power, wherein each of the plurality of generators is driven by one of the plurality of main engines;
    a plurality of primary power panels, wherein each primary power panel receives the HVAC power from a respective one of the plurality of generators;
    a plurality of distribution conversion units located throughout the aircraft, wherein the plurality of distribution conversion units convert the HVAC power received from one of the plurality of primary power panels into medium voltage AC (MVAC) power and low voltage DC (LVDC) power for consumption by local loads within the aircraft;
    a plurality of HVAC distribution feeder lines, wherein each HVAC distribution feeder line connects the one of the plurality of primary power panels to one of the plurality of distribution conversion units;
    a bi-directional power converter for converting the HVAC power into LVDC power and also converting LVDC power into HVAC power; and
    an energy storage device in communication with the bi-directional power converter, wherein the energy storage device provides HVAC power and MVAC power in response to a loss of generator power.

11. The electrical power distribution system of claim 10, comprising a plurality of remote power distribution units (RPDUs) located throughout the aircraft to distribute both the MVAC power and the LVDC power to the local loads.

12. The electrical power distribution system of claim 11, comprising a plurality of MVAC load feeders connecting a respective one of the plurality of distribution conversion units with a respective one of the plurality of RPDUs.

13. The electrical power distribution system of claim 11, comprising a plurality of LVDC load feeders connecting a respective one of the plurality of distribution conversion units with a respective one of the plurality of RPDUs.

14. The electrical power distribution system of claim 10, wherein the HVAC power is a voltage value above about 150 VAC.

15. The electrical power distribution system of claim 10, wherein the MVAC power ranges from over about 80 VAC to under about 150 VAC.

16. The electrical power distribution system of claim 10, wherein the LVDC power is under about 70 VDC.

17. The electrical power distribution system of claim 10, comprising at least one auxiliary power unit (APU) and an APU generator driven by the APU within the aircraft.

18. A method of converting and distributing electrical power to localized loads within an aircraft, comprising:
- creating high voltage AC (HVAC) power by a plurality of generators, wherein each of the plurality of generators is driven by one of a plurality of main engines;
- sending the HVAC power from the plurality of generators to respective primary power panels;
- sending the HVAC power from the respective primary power panels to a plurality of distribution conversion units located throughout the aircraft;
- converting the HVAC power from the primary power panel into medium voltage AC (MVAC) power and low voltage DC (LVDC) power for consumption by local loads within the aircraft by the plurality of distribution conversion units; and
- in response to a loss of generator power, providing HVAC power and MVAC power by an energy storage device in communication with a bi-directional power converter, wherein the bi-directional power converter is for converting the HVAC power into LVDC power and also converting LVDC power into HVAC power.

19. The method as recited in claim 18, comprising distributing both the MVAC power and the LVDC power to the local loads by a plurality of remote power distribution units (RPDUs) located throughout the aircraft.

20. The method as recited in claim 18, wherein the HVAC power is any voltage value above about 150 VAC, the MVAC power ranges from under about 150 VAC to over about 80 VAC, and the LVDC power is under about 70 VDC.

* * * * *